3,391,201
PROCESS FOR SEPARATING MIXTURES OF CYCLOALIPHATIC FLUORINE COMPOUNDS
Horst Jaeger, Bettingen, Switzerland, assignor to Ciba Limited, Basel, Switzerland, a company of Switzerland
No Drawing. Filed Dec. 7, 1965, Ser. No. 512,228
Claims priority, application Switzerland, Dec. 30, 1964, 16,874/64
5 Claims. (Cl. 260—648)

ABSTRACT OF THE DISCLOSURE

A process is provided for separating mixtures of perfluorinated cycloaliphatic compounds containing a six-membered ring by azeotropic distillation of the mixtures together with an inert, water-soluble solvent such as acetone, dioxane or absolute ethanol. The fluoro compounds are isolated from the fractional distillates by mixing with sufficient water to enable the organic solvent to dissolve therein. The temperature range of an individual fraction is about 0.5° to 2° C.

---

When benzene is fluorinated with the use of cobalt trifluoride as fluorine donor, so-called perfluorinated cyclohexanes, substantially a mixture of dodecafluorocyclohexane and fluorocyclohexanes containing hydrogen, are obtained. Such mixtures are extremely difficult to separate. When the mixture is treated with a concentrated aqueous alkali metal hydroxide solution, for example with potassium hydroxide solution of 50% strength, hydrogen fluoride is eliminated from the per-fluorocyclohexanes and fluorocyclohexenes are formed. From these mixtures, too, the constituents can be separated only with difficulty. The present process is a substantial advance in this sphere.

It has been found that mixtures of cycloaliphatic fluoro compounds lend themselves well to separation when they are subjected to an azeotropic distillation together with an inert, water-soluble organic solvent and from the fractional distillates the fluoro compounds are isolated.

The mixtures of fluoro compounds, especially those which contain six-membered rings, to be subjected to the azeotropic distillation may widely differ in their composition insofar as the number and constitution of the components are concerned. They may be compounds obtained by fluorinating benzene, toluene, xylenes, cumene, pseudocumene, mesitylene or other alkylbenzenes. They comprise advantageously one or several constituents containing an unsaturated cycloaliphatic ring, as is the case with the afore-mentioned mixtures obtained by treating perfluorocyclohexanes with potassium hydroxide solution; as a rule, these mixtures contain, in addition to unchanged dodecafluorocyclohexane, decafluorocyclohexane, octafluorocyclohexane-diene-(1,3) and -(1,4), all of which compounds are present in the mixture in substantial proportions, for example of at least 5% of the weight of the mixture. In many cases the mixtures contain also compounds that have not undergone complete fluorination, for example the compound of the formula (1)

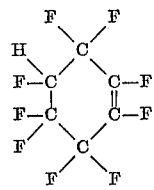

To separate the mixtures of fluoro compounds by the present process an organic solvent is needed to act as the so-called azeotropic entraining liquid; it must be inert, that is to say it must not react during the distillation with the fluoro compounds to be isolated. Furthermore, it must be water-soluble; it is advantageous to use solvents that are miscible with water in all proportions. It is also of advantage to use solvents that are composed exclusively of carbon, hydrogen and oxygen. As relevant examples there may be mentioned dioxane and above all acetone.

The azeotropic distillation according to this invention may be performed in any one of the known devices. In general, the individual temperature stages are very distinct so that the temperature range of an individual fraction in the actual performance of the process is about 0.5° to 2° C. It is, of course, advantageous to know accurately the qualitative and quantitative composition of the mixture to be separated before subjecting it to the treatment according to the present process. This composition can be determined without difficulty by gas-chromatography.

The fluoro compounds are then isolated from the successive distillates or fractions obtained by the azeotropic distillation. It is advantageous to add to each distillate sufficient water to enable the organic solvent to dissolve in it. From this aqueous phase the fluoro compound, which separates out as the second liquid phase, is easy to separate and can, if necessary, be dried and further purified. If it is desired to prepare fluoro compounds of a very high degree of purity, the process can be repeated by a second azeotropic distillation of the products resulting from the isolation of the fluoro compounds from one or several fractions of the azeotropic distillation.

Percentages in the following example are by weight.

EXAMPLE

A mixture of acetone (or, alternatively, dioxane) and highly fluorinated cycolaliphatic compounds containing a six-membered ring is distilled in an electrically heated distillation flask. If the mixture contains dodecafluorocyclohexane, this is first removed with the aid of a standard distillation head at a temperature not exceeding 34° C. The residue is then subjected to fractional distillation in a silvered Dewar column of 2 m. height, filled with wire mesh bodies of stainless steel, equipped with an automatically controlled column head. The reflux ratio is 1:10.

Fractions of a boiling range from 0.5° to 1° C. are collected. The individual fractions are removed from the collector and the solvent is removed by adding water. The non-aqueous bottom layer, which contains the fluoro compound, is dried over sodium sulphate and subjected to gas-chromatographic examination.

The following table lists the results of a few distillations performed in this manner. The columns contain the following details:

II=solvent, composition and amount
III=composition of the mixture subjected to the distillation; the first figure is the total weight, this is followed by the amount of the constituents in percent
IV=isolated fractions, with the following details:
    (a) yield, in percent, referred to the amount of the individual compound, listed in Column III;
    (b) purity, content of the compound of the formula shown in the isolated fractions, in percent;
    (c) content of the compound of the indicated formula in the fraction, in percent, the remainder up to 100% consists of the solvent shown in Column II; and
    (d) boiling range of the fraction.

Furthermore, the individual compounds are shown as follows:

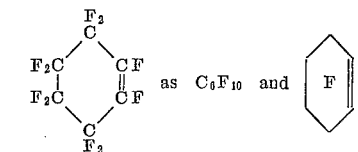 as $C_6F_{10}$ and 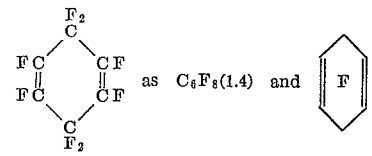

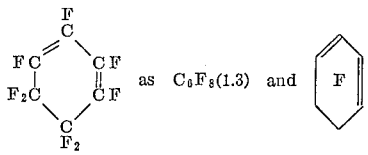 as $C_6F_8(1.3)$ and

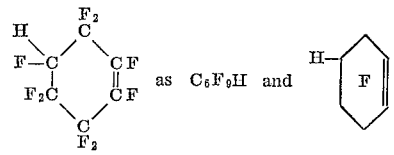 as $C_6F_8(1.4)$ and

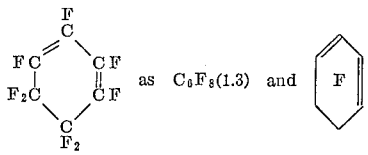 as $C_6F_9H$ and

Nos. 3 to 6 of the table refer to the purification of fractions obtained by an azeotropic distillation according to the present process and then treated another time by this process after having removed the organic solvent.

| I | II | III | IV Separated fraction (a)=yield (c)=content of fluoro compound in the azeotrope (b)=purity (d)=boiling range, °C. | | | |
|---|---|---|---|---|---|---|
| No. | Amount solvent | Mixture to be separated (amount, composition) | ⬡F | ⬡F | ⬡F | H—⬡F |
| 1 | 1,000 g. acetone | 1,080 g., consisting of: 27.10% $C_6F_{12}$. 31.16% $C_6F_{10}$. 9.91% $C_6F_8$ (1,3). 7.69% $C_6F_8$ (1,4). 7.75% $C_6F_9H$. Plus high-boiling constituents. | (a) 63%. (b) 89.56%. (c) 73%. (d) 36° to 36.5°. | (a) 40.6%. (b) 89.32%. (c) 64.5%. (d) 43.5° to 44°. | (a) 48.0%. (b) 89.65%. (c) 52.7%. (d) 48° to 50°. | (a) 8.65%. (b) 84.32%. (c) 25.3%. (d) 55° to 56°. |
| 2 | 1,000 g. acetone | 1,672 g., consisting of: 35.60% $C_6F_{12}$. 27.30% $C_6F_{10}$. 11.67% $C_6F_8$ 1,3). 12.53% $C_6F_8$ (1,4). 4.66% $C_6F_9H$. Plus high-boiling constituents. | (a) 77%. (b) 93.4%. (c) 73%. (d) 36.5° to 37.5°. | (a) 91.7%. (b) 97.5%. (c) 75.5%. (d) 42.0° to 47.5°. | (a) 84.6%. (b) 95.05%. (c) 47.0%. (d) 47.5° to 50.0°. | (a) — (b) — (c) — (d) — |
| 3 | 350 g. acetone | 850 g., consisting of: 35.46% $C_6F_{12}$. 63.54% $C_6F_{10}$. 0,98% $C_6F_8$ (1,3). | (a) 52.3%. (b) 99.7%. (c) 73%. (d) 36.0° to 38.0°. | (a) — (b) — (c) — (d) — | | |
| 4 | 250 g. acetone | 503 g., consisting of: 6.53% $C_6F_{12}$. 42.69% $C_6F_{10}$. 50.78% $C_6F_8$ (1,3). | (a) 60.0%. (b) 99.57%. (c) 74.5%. (d) 35° to 36°. | (a) 47.2%. (b) 100%. (c) 77.5%. (d) 44° to 46°. | | |
| 5 | 400 g. | 698 g., consisting of: 0.63% $C_6F_{12}$. 33.46% $C_6F_8$ (1,3). 63.92% $C_6F_8$ (1,4). 1.97% $C_6F_9H$. | | (a) 83%. (b) 95.6%. (c) 77.2%. (d) 42° to 46°. | (a) 41.7%. (b) 95.4%. (c) 45.4%. (d) 48° to 49°. | (a) — (b) — (c) — (d) — |
| 6 | 300 g. acetone | 435 g., consisting of: 2,84% $C_6F_{12}$. 0.4% $C_6F_{10}$. 10.6% $C_6F_8$ (1,3). 78,85% $C_6F_8$ (1,4). 5,88% $C_6F_9H$. 1.42% $C_6F_7H$. | (a) — (b) — (c) — (d) — | (a) — (b) — (c) — (d) — | (a) 45.0%. (b) 99.8%. (c) 42.3%. (d) 48,8° to 49.5°. | (a) — (b) — (c) — (d) — |
| 7 | 50 g. dioxan | 56.8 g., consisting of: 8.57% $C_6F_{12}$. 54.50% $C_6F_{10}$. 37.0% $C_6F_8$ (1,3). A 30 cm. column of filler bodies was used. | (a) 23.0%. (b) 82.7%. (c) 33%. (d) 50° to 51°. | (a) 13.5%. (b) 81.5%. (c) 69.3% (d) 51° to 52°. | | |

| I | II | III | IV | | |
|---|---|---|---|---|---|
| No. | Amount solvent | Mixture to be separated (amount, composition) | Separated fraction (a)=yield  (c)=content of fluoro compound in the azeotrope. (b)=purity  (d)=boiling range, °C. | | |
| 8 | 400 g. acetone | 816 g., consisting of: 1.93% dodecafluorocyclohexane. 6.18% undecafluorocyclohexane. 35.87% trifluoromethylperfluoro-cyclohexane. 54.46% bis-(1,4)trifluoromethyl)-cyclohexane. 1.53% 1,2-trifluoromethylcyclo-hexane, containing hydrogen. | (a) 48.60%. (b) 99.0%. (c) 85.1%. (d) 46.0 to 46.5°. 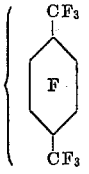 | | |
| 9 | 550 g. acetone | 1,445 g., consisting of: 0.15% dodecafluorocyclohexane. 7.97% undecafluorocyclohexane. 48.38% bis-(1,2-trifluoro)-perfluoro-cyclohexane. 0.63% II.   2.56% IX. 7.28% III.  2.26% X. 13.97% IV.  2.16% XI. 19.14% V.   5.13% XII. 2.04% VI. 4.04% VII. 4.05% VIII. | (a) 95.14%. (b) 99.5%. (c) 78.2%. (d) 45 to 45.5°. | 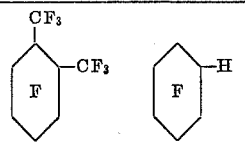 | (a) 74.04%. (b) 95.57%. (c) 56.30%. (d) 37.5 to 40°. |

Substances II to XII have not yet been cleanly separated so that unambiguous identification is yet to come. The mixture consists of fluorinated, hydrogen-containing bis-(1,2-trifluoro)-methylcyclohexanes.

| I | II | III | IV | | |
|---|---|---|---|---|---|
| No. | Amount solvent | Mixture to be separated (amount composition) | Separated fraction (a)=yield  (c)=content of fluoro compound in the azeotrope. (b)=purity  (d)=boiling range, °C. | | |
| 10 | 24 g. acetone | 54 g., consisting of: 1.57% I     30.22% IV 3.07% II    9.25% V 1.182% III  54.64% VI  This is a mixture of 1,2,4-trifluoro-methylfluoro-cyclohexanes. | (a) 30.88%. (b) 96.43%.  IV (c) 72.0%. (d) 53 to 53.5°. | (a) 53.38%. (b) 100%.  VI (c) 87%. (d) 54.5 to 54.7°. A 30 cm. column of filler bodies was used. | |
| 11 | 30 g. acetone | 68 g., consisting of: 4.11% $C_5F_{12}$ 14.71% $C_6F_{14}$ n-alkanes 37.94% $C_6F_{12}$ 2.17% IV    0.17% VII 2.94% V     34.31% VIII $C_9F_{18}$ 1.17% VI    2.46% IX  This is a mixture of fluorinated alkyl-cyclohexanes. A 30 cm. column of filler bodies was used. | (a) 100%. (b) 72.5%. (c) 35.5%. (d) 24 to 27.5°. I $C_5F_{12}$ | III 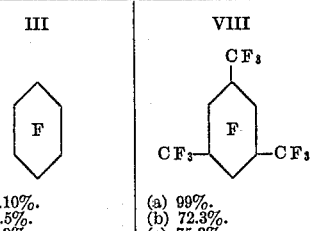 (a) 13.10%. (b) 86.5%. (c) 37.3%. (d) 33 to 35.5°. | VIII 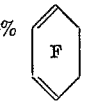 (a) 99%. (b) 72.3%. (c) 75.3%. (d) 35.5 to 36°. |

| I | II | III | IV | | |
|---|---|---|---|---|---|
| No. | Amount solvent | Mixture to be separated (amount, composition) | Separated Fraction (a)=yield  (c)=content of fluoro compound in the azeotrope (b)=purity  (d)=boiling range, °C | | |
| 12 | 40 g. absolute ethanol | 40 g. consisting of: 13.75% 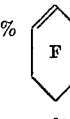   12.71% IV. 9.26% V. 26.32% VI. 1.75%    8.57% VII. 3.25% VIII. 7.69% IX. 15.20% 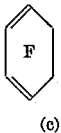   1.31% X.  This is a mixture of fluorinated cyclohexyl-alkenes and fluorobenzenes. A 30 cm. column of filler bodies was used. | 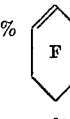 (a) 67.5%.   (c) 45.3%. (b) 71.0%.   (d) 58 to 59.5°. | | |

| I No. | II Amount solvent | III Mixture to be separated (amount, composition) | IV Separated fraction (a)=yield  (c)=content of fluoro compound in the azeotrope  (b)=purity  (d)=boiling range, ° C. | |
|---|---|---|---|---|
| 13 | 400 g. acetone | 1,030 g., consisting of:<br>49.52% $C_6F_{12}$ (F-cyclohexane)<br>23.28% $C_6F_{11}H$ (F,H-cyclohexane)<br>2.04% $C_6F_{10}H_2$ (H,H/F,F-cyclohexane)<br>7.76% (H/F,H-cyclohexane)<br>3.57% V.<br>1.65% VI.<br>6.23% VII.<br>2.9% VIII.<br>2.9% IX. | $C_6F_{12}$<br>(a) 85.79%.<br>(b) 94.1%.<br>(c) 35.3%.<br>(d) 38 to 40°. | $C_6F_{11}H$<br>(a) 73.72%.<br>(b) 90.74%.<br>(c) 100% no azeotrope.<br>(d) 58.5 to 60°. |

| I No. | II Amount solvent | III Mixture to be separated (amount, composition) | IV Separated fraction (a)=yield  (c)=content of fluoro compound in the azeotrope  (b)=purity  (d)=boiling range, ° C. |
|---|---|---|---|
| 14 | 80 g. dioxan | 105 g., consisting of:<br>20.12% I.    4.079% VII.<br>37.61% II.   1.64% VIII.<br>8.42% III.   1.26% IX.<br>11.84% IV.   1.047% X.<br>2.82% V.    0.374% XI–XX.<br>3.11% VI.   2.681% XXI.<br>This is a mixture of fluorinated 1,3,5-trifluoro-methylcyclohexanes. A 30 cm. column of filler bodies was used. | II (1,3,5-tris-$CF_3$ cyclohexane with F)<br>(a) 78.5%.<br>(b) 84.0%.<br>(c) 73.5%.<br>(d) 88.8° C. |
| 15 | 80 g. acetone | 139 g., consisting of:<br>2.47% I.    10.10% V.<br>4.85% II.   1.73% VI.<br>65.7% III.  0.89% VII.<br>12.50% IV.  1.37% IX–XVII.<br>The values I–XVII are not identical with the values I–XVII of Example 14.<br>This is a mixture of fluorinated 1,3,5-trifluoromethyl-cyclohexanes and fluorinated 1,3-trifluoromethyl-cyclohexanes. A 30 cm. column of filler bodies was used. | III (1,3-bis-$CF_3$ cyclohexane with F, $CF_3$)<br>(a) 78.8%.<br>(b) 98.1%.<br>(c) 69.2%.<br>(d) 51.5 to 51.8° C. |

What is claimed is:

1. Process for separating mixtures of cycloaliphatic fluoro compounds containing a six-membered ring, which comprises subjecting these mixtures together with a member selected from the group consisting of acetone, dioxane and absolute ethanol to an azeotropic distillation and isolating from the individual distillates the fluoro compounds.

2. Process according to claim 1, which comprises mixing the individual distillates with sufficient water to enable the organic solvent to dissolve therein.

3. Process according to claim 1, which comprises subjecting to the azeotropic distillation a mixture containing substantial proportions of dodecafluoro-cyclohexane, decafluoro-cyclohexene, octafluoro-cyclohexadiene-(1,3) and octafluoro-cyclohexadiene-(1,4).

4. Process according to claim 3, which comprises preparing the mixture to be subjected to the azeotropic distillation by treating a mixture of dodecafluoro-cyclohexane and hydrogen-containing fluorocyclohexanes obtained by fluorinating benzene, with a concentrated aqueous alkali metal hydroxide solution.

5. Process according to claim 1, which comprises preparing the mixture to be subjected to the azeotropic distillation by fluorinating a member selected from the groups consisting of toluene, 1,2-xylene, 1,3-xylene and other alkylbenzenes.

References Cited

UNITED STATES PATENTS

| | | | |
|---|---|---|---|
| 2,432,997 | 12/1947 | Ligett et al. | 260—648 |
| 2,473,911 | 6/1949 | Sarsfield | 260—653 |
| 3,282,801 | 11/1966 | Wüst | 203—62 |

BERNARD HELFIN, *Acting Primary Examiner.*

LEON ZITVER, *Examiner.*

M. JACOBS, *Assistant Examiner.*